(No Model.)

E. LA ROCHELLE.
NUT LOCK.

No. 494,338.  Patented Mar. 28, 1893.

WITNESSES:
A. D. Harrison.
M. A. Jackson

INVENTOR:
E. La Rochelle
by Wright Brown Crosley
Attys.

UNITED STATES PATENT OFFICE.

EPHREM LA ROCHELLE, OF SALEM, MASSACHUSETTS, ASSIGNOR, BY DIRECT AND MESNE ASSIGNMENTS, OF TWO-THIRDS TO EMILE POIRIER, OF SAME PLACE.

NUT-LOCK.

SPECIFICATION forming part of Letters Patent No. 494,338, dated March 28, 1893.

Application filed December 10, 1892. Serial No. 454,695. (No model.)

*To all whom it may concern:*

Be it known that I, EPHREM LA ROCHELLE, of Salem, in the county of Essex and State of Massachusetts, have invented certain new and useful Improvements in Nut-Locks, of which the following is a specification.

This invention has for its object to provide a device for locking a nut securely upon the bolt with which it is engaged, and it consists mainly in a nut-locking device comprising two parts or members, namely, first, a plate formed to encircle the bolt and adapted to be bent over into engagement with the nut to prevent the independent rotation of the latter, and provided with an ear or lug formed to indent the threads of the bolt when the said plate is moved edgewise while in place on the bolt; and, secondly, a washer, also formed to encircle the bolt and provided with a seat which is arranged to receive the thread-indenting ear or lug on the nut-locking plate; the arrangement being such that, when the said plate and washer are placed upon a bolt and interposed between the nut engaged with said bolt and the fixed surface against which the pressure of the nut is exerted, the seat in the washer will co-operate with the back or outer surface of the thread-indenting ear, in such manner that, when the nut is turned to place, its pressure against the locking plate will cause a lateral or edgewise movement of the plate, so that its lug will be forced into the thread of the bolt, thus interlocking the plate with the bolt, the nut being subsequently interlocked with the plate by bending a portion of the plate outwardly to give it a bearing on one or more of the sides of the nut, all of which I will now proceed to describe.

Figure 1:
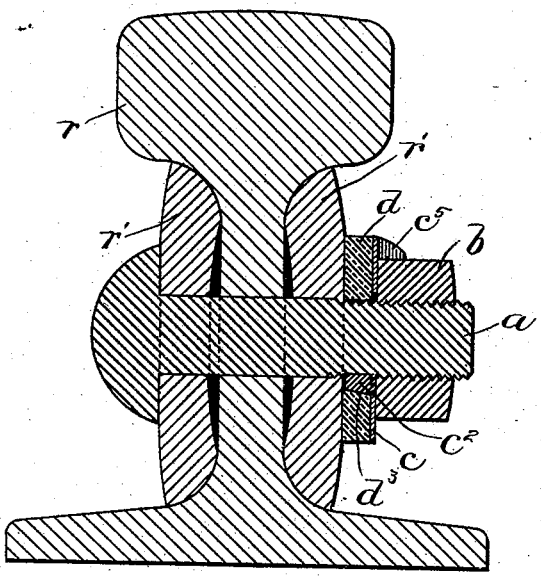
Figure 2:
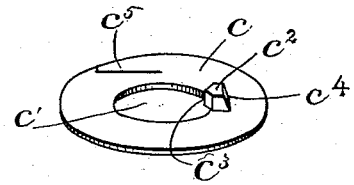
Figure 3:
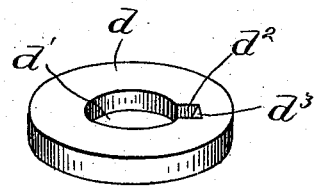
Figure 5:
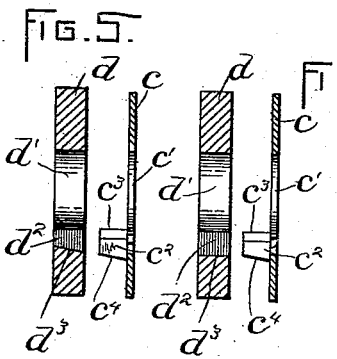
Figure 4:
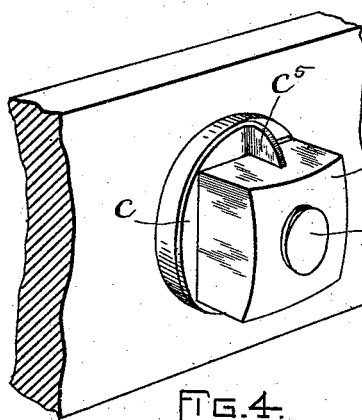
Figure 6:
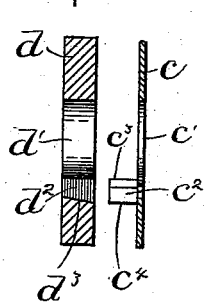
Figure 7:
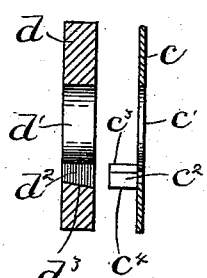

Of the accompanying drawings, forming part of this specification: Figure 1 represents a longitudinal section of a bolt and its nut, having my improved nut-locking devices, the whole being shown as applied to a rail-road rail and the fish-plates thereon. Fig. 2 represents a perspective view of the nut-locking plate. Fig. 3 represents a perspective view of the washer. Fig. 4 represents a perspective view, showing the plate bent outwardly to engage one of the sides of the nut and prevent rotation of the latter. Fig. 5 represents a sectional view, showing the nut-locking plate and washer detached from each other. Figs. 6 and 7 represent views similar to Fig. 5, showing slight modifications hereinafter referred to.

The same letters of reference indicate the same parts in all the figures.

In the drawings: $a$ represents a bolt, which is or may be of ordinary construction, and $b$ represents an ordinary nut engaged with said bolt.

$c$ represents a plate, formed to encircle the bolt, and preferably of annular form, the plate having a central opening $c'$ of larger diameter than the bolt, so that, when the plate encircles the bolt, it has some freedom of edgewise movement on the bolt. To the plate $c$ is affixed at one side of the opening $c'$ an ear or lug $c^2$, which projects from one side of the plate and is provided with an acute-angled cutting edge $c^3$, projecting slightly into the central opening $c'$ and adapted to indent the thread of the bolt, as hereinafter described.

$d$ represents the washer, which is also formed to encircle the bolt, and has a central opening $d'$, through which the bolt passes. At one side of said opening is a seat $d^3$, which is preferably the bottom of a slot $d^2$, formed in the washer at one side of the opening $d'$. Said seat $d^3$ is arranged to bear on the back or outer face $c^4$ of the lug $c^2$. The seat $d^3$ and the back $c^4$ of the lug are so formed that, when the washer $d$ is rigidly supported and the plate $c$ is pressed toward the washer while the outer face of the lug $c^2$ is in contact with the seat $d^3$, a lateral movement will be given to the plate $c$ in the direction required to force the indenting edge of the lug $c'$ into the thread of the bolt. This result is preferably produced by beveling the seat $d^3$ and the outer face $c^4$ of the lug, as shown in Figs. 1, 2, 3 and 5, so that, when the lug is moved along the seat, it will also be moved laterally, as will be readily understood. A similar result may be produced by beveling only the outer face $c^4$ of the lug, the seat $d^3$ being parallel with the axis of the bolt, as shown in Fig. 6; or by beveling the seat $d^3$, leaving the outer face $c^4$ parallel with the axis of the bolt, as shown in Fig. 7. The beveled form of both the seat and outer face of the lug is preferable, however, for obvious reasons.

The plate $c$ is preferably made of a comparatively thin sheet metal, so that portions of its margin may be bent over upon the nut, as shown in Figs. 1 and 4, thus engaging the nut with the plate, so that the nut cannot rotate independently. I prefer to cut the plate, so as to form a tongue $c^5$ at one or more points, said tongue being adapted to be readily bent outward and to bear upon one of the sides of the nut.

The operation of the improved device is as follows: The bolt being in place in the parts which it is to connect, said parts being, as here shown, a rail-road rail $r$ and fish-plates $r'$ $r'$, the washer $d$ is placed upon the bolt against one of the fish-plates. The plate $c$ is then placed upon the bolt with the outer face of the lug $c$ in contact with the seat $d^3$. The nut is then screwed upon the bolt, and, as it moves inwardly, it forces the plate $c$ along with it, the lug $c^2$ being thus caused to move along the seat $d^3$ and to receive a lateral movement toward the bolt, so that the cutting edge of the lug is caused to indent the bolt more or less deeply by the time the nut has pressed the plate $c$ closely against the washer. The plate $c$ is therefore firmly interlocked with the bolt. The nut may then be locked to the plate by bending outwardly the tongue $c^5$, or otherwise bending the marginal portion of the plate to give it a bearing upon the nut.

I claim—

1. A nut-locking device, comprising, first, a bolt-encircling plate adapted to be bent into engagement with the nut and having an ear or lug to indent and engage the threads on the bolt, the back of said ear or lug being beveled; and, secondly, a bolt-encircling washer having a recess, the bottom of which is beveled and constitutes a seat for the beveled back of said lug, the said plate and its lug being moved by the bearing of the beveled back on the beveled seat when lateral pressure is exerted on the plate by a nut on the bolt, as set forth.

2. The combination with a bolt and its nut, of a plate laterally movable on the bolt and provided with an ear or lug to indent and engage the threads on the bolt, and a washer having a seat formed to bear on the back of said ear or lug, the said plate being adapted for engagement with the nut, as set forth.

In testimony whereof I have signed my name to this specification, in the presence of two subscribing witnesses, this 6th day of December, A. D. 1892.

EPHREM LA ROCHELLE.

Witnesses:
EMILE POIRIER,
A. D. HARRISON.